United States Patent [19]

Piotrowski et al.

[11] Patent Number: 5,371,127

[45] Date of Patent: Dec. 6, 1994

[54] STABILIZED CARBON MONOXIDE-OLEFIN COPOLYMERS

[75] Inventors: Andrzej M. Piotrowski, Peekskill; Norbert A. Langwald, Dobbs Ferry, both of N.Y.

[73] Assignee: Akzo Nobel N.V., Arnhem, Netherlands

[21] Appl. No.: 686,089

[22] Filed: Apr. 16, 1991

[51] Int. Cl.$^5$ .................... C08K 5/15; C08K 5/36; C08K 5/13
[52] U.S. Cl. .................... 524/114; 524/289; 524/291
[58] Field of Search ............... 524/289, 285, 114, 291

[56] References Cited

U.S. PATENT DOCUMENTS

| | | | |
|---|---|---|---|
| 3,285,855 | 11/1966 | Dexter et al. | 524/219 |
| 3,441,575 | 4/1969 | Dexter et al. | 560/64 |
| 3,929,727 | 12/1975 | Russell | 260/45.95 F |
| 3,948,832 | 4/1976 | Hudgin | 528/392 |
| 4,795,774 | 1/1989 | Kluttz | 524/246 |
| 4,935,304 | 6/1990 | Danforth | 525/539 |
| 4,992,499 | 2/1991 | Syrier et al. | 524/291 |

FOREIGN PATENT DOCUMENTS

| | | | |
|---|---|---|---|
| 289077 | 11/1988 | European Pat. Off. | |
| 92-20734 | 11/1992 | WIPO | C08K 5/13 |

*Primary Examiner*—Paul R. Michl
*Assistant Examiner*—Tae H. Yoon
*Attorney, Agent, or Firm*—Richard P. Fennelly; Louis A. Morris

[57] ABSTRACT

Polyketone compositions can be stabilized by the addition of a suitable stabilizing amount of a blend of a hindered phenol compound, such as a thioester-containing hindered phenol and an epoxy compound (such as an epoxy cycloaliphatic carboxylate).

6 Claims, No Drawings

STABILIZED CARBON MONOXIDE-OLEFIN COPOLYMERS

BACKGROUND OF THE INVENTION

Copolymers of carbon monoxide and an olefin, commonly termed a "polyketone", are a well-recognized class of copolymer synthesized through copolymerization of carbon monoxide with one or more olefins in the presence of a suitable catalyst.

Certain disclosures exist in the patent literature in regard to the stabilization of polyketone materials including: U.S. Pat. Nos. 3,929,727 (use of 2,2'-dihydroxy-4-methoxybenzophenone); 3,948,832 (use of one or more epoxy group-containing compounds alone); 4,024,104 (use of substituted 2(2'-hydroxyphenyl)-benzotriazoles); 4,761,448 (use of an aluminum trialkoxide or hydrolysis product thereof); 4,795,774 (use of certain aromatic amines of up to two aromatic rings and at least one amino group); 4,808,678 (use of a polymeric, linear hydroxyalkyl ether of bis(hydroxyphenyl)alkane); 4,857,570 (use of a succinic anhydride or hydrolysis product thereof); 4,950,703 (use of aluminum phenoxide); 4,954,548 (use of an aromatic diamine and a particular type of carbon black); 4,954,552 (use of barium or titanium acetylacetonate); 4,954,555 (use of aluminum stearate); 4,960,807 (use of zinc oxide, zinc sulfide and a trialkylphosphite); and 4,960,808 (use of certain phenolic compounds). U.S. Patent Document No. H732 (use of an oligomer derived from epihalohydrin and a hydroxyphenylalkane); European Patent Publication Nos. 288,124 (use of diarylamines, hydroxybenzophenones, and benzotriazoles or benzotriazines); 326,223 (use of a sterically hindered phenolic (blend) compound of a particular type); and 326,224 (use of certain acid amides or aluminum compounds).

SUMMARY OF THE INVENTION

The present invention resides in the use of a blend of a hindered phenol compound and an epoxy compound as the stabilizing agents for the aforementioned class of polyketone.

DETAILED DESCRIPTION OF THE PRESENT INVENTION

The disclosures of the various aforementioned U.S. patents is incorporated herein by reference in regard to their teaching as to how the polyketone composition which is to be stabilized can be formed. Generally speaking, such polymers will have a molecular weight of anywhere from about 1,000 to about 1,000,000, preferably about 50,000 to about 250,000. They can be formed by polymerizing the appropriate monomers (i.e. carbon monoxide and the selected olefin or olefins) in the presence of a catalytic amount of a catalyst formed from a compound of a Group VIII metal, an anion of a non-hydrohalogenic acid, and a bidentate ligand of phosphorus, arsenic or antimony.

In accordance with the present invention, the above-referenced polymers have intimately mixed therewith a suitable stabilizing quantity of a blend of a hindered phenol compound and an epoxy compound.

The hindered phenol compounds which are useful herein comprise compounds of the general formula

where Ar is a phenyl group containing one or more branched chain alkyl substituents shielding the hydroxy substituent thereon and where L is a suitable linking group between the substituents ArOH. For example, the esters of hindered hydroxybenzoic and hydroxyphenylalkanoic acids described in U.S. Pat. Nos. 3,285,855 and 3,441,575 form one class of esters useful as hindered phenol compounds herein. A particularly preferred compound of this class is a thioester-containing hindered phenol which is sold under the trademark IRGANOX 1035 and is thiodiethylene bis-(3,5-di-tert-butyl-4-hydroxy)hydrocinnamate.

The epoxy compound stabilizer component which can be used with the aforementioned aromatic amine compound include the type of epoxy compounds described in U.S. Pat. No. 3,948,832 at Col. 2, lines 20 to 47 inclusive, which is incorporated herein by reference. Representative compounds are organic compounds (e.g., aliphatic, including cycloaliphatic, or aromatic which contain one or, more epoxy groups. One particularly preferred epoxy is an epoxy cycloaliphatic carboxylate, such as (3',4'-epoxycyclohexylmethyl)3,4-epoxycyclohexanecarboxylate.

It is preferred that both the hindered phenol and epoxy compounds chosen have a relatively low vapor pressure so that they will be retained in the polyketone during high temperature processing or use of such compositions.

In general, the amounts of the stabilizer blend that are used in accordance with the present invention can range anywhere from about 1%, by weight, up to about 25%, by weight of the polyketone. Preferable amounts range from about 5% to about 15%, by weight, of the polyketone. Generally, it is advisable to choose an amount of stabilizer at the lower portions of the above given ranges in order to avoid adversely affecting the mechanical properties of the resulting polyketone. In general, the weight ratio of hindered phenol compound to epoxy compound in, the stabilizer blend can range anywhere from about 1:5 to about 5:1.

The stabilizer blend of this invention is preferably added to the polyketone by blending when the polyketone is in the form of a powder or dissolved in a solvent. The method of incorporation is not believed to be critical although it is preferred that a homogeneous mixture of polyketone and stabilizer blend be achieved.

Other additives, such as fillers, extenders, plasticizers, coloring agents, other polymeric materials, etc., can be added to the polyketone being stabilized.

The resulting stabilized polyketone compositions exhibit improved thermal stability and can be processed for extended periods of time at elevated temperatures with an enhanced degree of stability. Typical methods of processing include injection molding, pressure forming, thermoforming and sheet extrusion. The materials can be used in applications where such polyketones are likely to encounter elevated temperatures including the thermoforming of food or drink containers, the production of shaped automotive parts by injection molding, or the production of wire and cable coatings by extrusion.

The Examples which follow illustrate some of the results that have been obtained using representative levels of the plasticizer of the present invention.

EXAMPLES 1-13

Catalyst Residue Removal

The $CO/C_2H_4$ copolymer or $CO/C_2H_4/C_3H_6$ terpolymer were suspended in hot acetyloacetone. The suspension was stirred for fifteen minutes at 120° C. and quickly filtered without cooling. The polymer was then washed with cold acetyloacetone followed by acetone and vacuum dried.

Sample Preparation

The $CO/C_2H_4$ copolymer or $CO/C_2H_4/C_3H_6$ terpolymer after catalyst residue removal was then added to an acetone solution of a modifier or modifier blend as described hereinafter and was dried with constant stirring to achieve good sample uniformity. Samples were then pressed into pellets which were then placed in the preheated testing chamber of a RHEOMETRICS RMS 800 rheometer. The rheometer is capable of measuring both components of complex viscosity (eta*), namely, the real (or loss) component (eta'), which can be correlated to the contribution of the viscous behavior of the material, and the imaginary (or storage) component (eta"), which can be correlated to the contribution of the elastic behavior. The character of the plots of both of these components versus time at a constant temperature provides information concerning the melting, softening or hardening of the material as well as its viscoelastic behavior. Each test was usually started at about 200° C., and the temperature was raised quickly to the preset level. The complex viscosity components were then measured. At first, a rapid drop in both components of complex viscosity was observed due to melting of the sample. With the exception of the pure $CO/C_2H_4$ copolymer, the storage component was lower than the loss component. This was followed by a time period with little or no viscosity change up to the point at which eta" become equal to eta' (gel point), and finally by an increase in the storage component (eta") of complex viscosity indicating crosslinking.

A long time period to the gel point and a small plot slope were indicative of good sample stability.

Data for the $CO/C_2H_4/C_3H_6$ terpolymer (POKC2C3) are listed in the Table:

TABLE

| Example # | Sample Composition | % | Temperature °C. | Time to gel point sec | Slope Pa × sec × sec$^{-1}$ |
|---|---|---|---|---|---|
| 1 | POKC2C3 | 100 | 237 | 330 | 0.58 |
| 2 | POKC2C3 | 95 | 235 | 318 | 0.79 |
|   | 1035 | 5 |   |   |   |
| 3 | POKC2C3 | 90 | 235 | 456 | 0.30 |
|   | 1035 | 5 |   |   |   |
|   | ERL | 5 |   |   |   |
| 4 | POKC2C3 | 87.5 | 238 | 564 | 0.32 |
|   | 1035 | 5 |   |   |   |
|   | ERL | 5 |   |   |   |
|   | VL848 | 2.5 |   |   |   |
| 5 | POKC2C3 | 90 | 237 | 360 | 1.29 for - 680 sec then 0.24 |
|   | 1035 | 2.5 |   |   |   |
|   | ERL | 2.5 |   |   |   |
|   | VL848 | 5 |   |   |   |
| 6 | POKC2C3 | 92.5 | 237 | 402 | 1.12 |
|   | 1035 | 2.5 |   |   |   |
|   | ERL | 2.5 |   |   |   |
|   | VL848 | 2.5 |   |   |   |
| 7 | POKC2C3 | 95 | 234 | 360 | 0.63 |
|   | 1035 | 2.5 |   |   |   |
|   | ERL | 2.5 |   |   |   |
| 8 | POKC2C3 | 90 | 238 | 500 | 0.20 |
|   | 1035 | 5 |   |   |   |
|   | ERL | 5 |   |   |   |
| 9 | POKC2C3 | 90 | 240 | 690 | 0.02 |
|   | 1035 | 5 |   |   |   |
|   | EPR | 5 |   |   |   |
| 10 | POKC2C3 | 90 | 240 | 500 | 0.03 |
|   | ESBO | 5 |   |   |   |
|   | VL848 | 5 |   |   |   |

ERL - ERL4221: (3',4'-Epoxycyclohexylmethyl)3,4-epoxycyclohexanecarboxylate.
VL848 - Vanlube 848: Mixed octylated diphenylamine and diphenyl amine (<7%).
1035 - Irganox 1035: Thiodiethylene bis(3,5-di-tert-butyl-4-hydroxy)hydrocinnamate.
EPR - Epoxidized phenolic resin.
ESBO - Epoxidized soybean oil.

The foregoing are intended to illustrate certain embodiments of the present invention and, for that reason, should not be construed in a limiting sense. The scope of protection sought is set forth in the claims which follow.

We claim:

1. A stabilized polyketone composition which comprises a stabilizing amount of a blend of a thioester-containing hindered phenol compound and an epoxy compound.

2. A stabilized polyketone composition which comprises from about 1% to about 25%, by weight of the polyketone, of a blend of a thioester-containing hindered phenol compound and an epoxy compound.

3. A polyketone composition as claimed in claim 1 wherein the stabilizing blend comprises an epoxy cycloaliphatic carboxylate.

4. A polyketone composition as claimed in claim 2 wherein the stabilizing blend comprises an epoxy cycloaliphatic carboxylate.

5. A polyketone composition as claimed in claim 1 wherein the stabilizing amount of the blend ranges from about 1% to about 25% and the weight ratio of phenol to epoxy ranges from about 1:5 to about 5:1.

6. A polyketone composition as claimed in claim 5 wherein the epoxy compound is an epoxy cycloaliphatic carboxylate.

* * * * *